US011166582B2

(12) United States Patent
Muth et al.

(10) Patent No.: US 11,166,582 B2
(45) Date of Patent: Nov. 9, 2021

(54) METHOD OF REMOTELY PERFORMING A RITUAL OF CHUCKING DURING HAJJ

(71) Applicant: King Fahd University of Petroleum and Minerals, Dhahran (SA)

(72) Inventors: Talal Bin Ali Ahmed Muth, Dhahran (SA); Basem Almadani, Dhahran (SA); Farouq Muhammad Aliyu, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 97 days.

(21) Appl. No.: 16/818,525

(22) Filed: Mar. 13, 2020

(65) Prior Publication Data
US 2021/0282583 A1   Sep. 16, 2021

(51) Int. Cl.
| | |
|---|---|
| H04L 12/24 | (2006.01) |
| A47G 33/00 | (2006.01) |
| G05B 19/4155 | (2006.01) |
| H04L 29/08 | (2006.01) |
| H04L 29/06 | (2006.01) |
| G06T 1/00 | (2006.01) |

(52) U.S. Cl.
CPC ....... *A47G 33/008* (2013.01); *G05B 19/4155* (2013.01); *G06T 1/0014* (2013.01); *H04L 63/0884* (2013.01); *H04L 67/125* (2013.01); *H04L 67/2809* (2013.01); *H04L 67/32* (2013.01); *G05B 2219/50391* (2013.01)

(58) Field of Classification Search
CPC . A47G 33/008; H04L 63/0884; H04L 67/125; H04L 67/32; H04L 67/2809; G06T 1/0014; G05B 19/4155; G05B 2219/50391

USPC ........................................................ 434/245
See application file for complete search history.

(56) References Cited

U.S. PATENT DOCUMENTS

| | | | | |
|---|---|---|---|---|
| 7,665,129 B2 * | 2/2010 | Carpy | ..................... | H04L 63/08 726/12 |
| 2013/0158708 A1 * | 6/2013 | Emmertz | ........... | G05B 19/0426 700/248 |
| 2015/0336270 A1 * | 11/2015 | Storr | ..................... | B25J 9/1674 700/245 |
| 2016/0072900 A1 * | 3/2016 | Rahman | ................ | H04L 67/306 709/213 |

(Continued)

*Primary Examiner* — El Hadji M Sall
*Assistant Examiner* — Elizabeth Kassa
(74) *Attorney, Agent, or Firm* — Oblon, McClelland, Maier & Neustadt, L.L.P.

(57) ABSTRACT

A method of performing a ritual of chucking during Hajj includes an authentication process, a connectivity process which connects a remote user to a chucking system located at the religious site, and a notification process. The authentication process allows a remote user, who is preferably a pilgrim unable to attend Hajj due to physical disability, age or sickness, to connect to the chucking system. The connectivity allows the pilgrim to perform the ritual of chucking remotely. To do so, the chucking system includes a primary pebble reservoir providing pebbles to a set of secondary pebble reservoirs, and a set of pebble projecting units. The remote user remotely connects to the set of pebble projecting units to chuck pebbles at the stoning sites, wherein the required pebbles are stored in the set of secondary pebble reservoirs. When chucking is complete, the remote user is notified regarding completion.

11 Claims, 7 Drawing Sheets

(56) References Cited

U.S. PATENT DOCUMENTS

2017/0050321 A1\* 2/2017 Look .............. G06Q 10/063118
2019/0072950 A1\* 3/2019 Clark ................... G05D 1/0038
2019/0381665 A1\* 12/2019 Storr ................. G06Q 10/0631

\* cited by examiner

METHOD OF REMOTELY PERFORMING A RITUAL OF CHUCKING DURING HAJJ

STATEMENT OF ACKNOWLEDGEMENT

The research was carried out with the support of The Permanent Committee for Scholarly Research and Fatwa.

BACKGROUND

Field of the Invention

The present disclosure relates to a method of remotely performing a religious ritual. More specifically, the present disclosure describes a method that allows pilgrims to perform a ritual of chucking during Hajj.

Description of the Related Art

In Islam, the five pillars represent the core beliefs and practices of Islam. Profession of faith, prayer, alms, fasting, and pilgrimage, which is also known as Hajj, are represented by the five pillars and are considered mandatory acts to be performed by believers who have the ability to do so. See Z. Ahmed et al., "Islamic pilgrimage (hajj) to ka'aba in makkah (Saudi Arabia): an important international tourism activity." *Journal of Tourism Studies*, vol. 3, no. 1, pp. 35-43, 1992; and G. Rowley, "The Centrality of Islam: Space, Form and Process," *GeoJournal*, vol. 18, no. 4, pp. 351-359, 1989. Available: http://dx.doi.org/10.1007/BF00772689, each incorporated herein by reference in their entirety.

With the rising population of Muslims, the number of pilgrims attending Hajj has seen a significant increase. The population of Muslims around the world is considered to be 1.65 billion. See H. Kettani, "2010 World Muslim Population," in *Proceedings of the $8^{th}$ Hawaii international conference on arts and humanities*, 2010, pp. 1-61, incorporated herein by reference in its entirety. With the number of pilgrims arriving in Saudi Arabia for Hajj increasing at an exponential rate, the Saudi Arabian government has taken action to minimize congestion through expansion projects of the holy mosque, developing new roads, and establishing new railway systems. However, congestion, accidents, and congestion related illnesses still seem to be existent.

Rami, a ritual of chucking also known as a ritual of stoning/stoning of the devil, is an obligatory aspect of Hajj, and as such is one of the areas that incur a large gathering of pilgrims during Hajj. During this ritual, pilgrims stone three walls (formerly pillars), known as Jamarit which takes place in Mina, a city east of Mecca. The ritual reminds pilgrims of when prophet Abraham pelt the devil who was tempting him to stop him from his promised sacrifice of his son (Ishmael) to the Almighty. The ritual must be carried out in three consecutive days starting with Eid al-Adha, the 10th day of the Islamic month of Dhu al-Hijjah. On this day, pilgrims must stone only the largest Jamrah seven times, after which pilgrims must cut or shave their hair. See M. al Bukhari et al., *Sahih al-Bukhari*. Hamdaan Publications, 1987, incorporated herein by reference in its entirety. On each of the remaining two days, pilgrims must stone each wall with seven pebbles with the smallest and finishing with the largest. See S. Khan, *Hajj Made Simple*. Goodword Books, 2014, incorporated herein by reference in its entirety.

It is important to point out that Islamic scholars have consensual agreement that it is permissible for the physically challenged who cannot perform Rami on their own to do so via a proxy. Shaykh Bin Baz was asked about the ruling on performing Rami via proxy for the sick, women and children to which Shaykh Bin Baz replied, "There is no problem for the sick, unable pregnant woman, fat and the weak who cannot throw Jamarāt, to do so by proxy". In another instance, the Standing Committee was asked the following: "I am an eighty year old man and I have performed Hajj last year, I perform Twāf in a carriage, and I could not perform Sa'i between Safa and Marwa while riding trolley/wheelchair, and I designated someone to throw Jamarāt on my behalf, for I am not able, and I heard from a student who came to us in Mina saying: 'If you cannot throw Jamarāt by yourself why perform pilgrimage?' Is my Hajj complete or do I need to add something? Knowing that he has previously performed Hajj. I need Fatwa". To which the response was: "If you are unable to perform Sa'i while walking because it will incur hardship beyond the usual, you may use trolley/wheelchair, and you are permitted to appoint someone to perform Rami on your behalf".

Systems for remotely controlling robots have been previously proposed. However, a majority of these systems do not function in real-time. See J. R. Storr, "System, method, computer program and data signal for the registration, monitoring and control of machines and devices," Mar. 20 2018, U.S. Pat. No. 9,919,426, incorporated herein by reference in its entirety. In particular, the response time of the robot to a command is significantly delayed considering the time the command was received. Since the ritual of chucking includes multiple stages, having real-time response from the robots performing the chucking process is essential.

Systems that can perform services according to the context have also been developed. See M. A. Rahman, F. U. Rehman, S. O. Hussain, A. Ahmed, and S. Basalamah, "Method and system for the generation of context aware services based on crowd sourcing," Mar. 10 2016, U.S. patent application Ser. No. 14/850,523, US 2016/0072900, incorporated herein by reference in its entirety. In such systems, a server provides users with services according to the data gathered about the user, the time, and the date.

A technique where a robot service is shared, wherein the robots perform different functions has also been previously disclosed. See D. Look, J. Awe, M. T. Davis, N. Arabani, and P. A. Vrobel, "Robot service platform," Oct. 1 2019, U.S. Pat. No. 10,430,744, incorporated herein by reference in its entirety. To do so, a unique profile needs to be made and published for each robot.

A system for locating and providing access rights to mobile robots has also been previously been disclosed. See A. W. Clark and R. Campbell, "Access rights of telepresence robots," Mar. 7 2019, U.S. patent application Ser. No. 16/081,472, US 2019/0072950, incorporated herein by reference in its entirety.

In view of the difficulties faced by certain pilgrims during Hajj and drawbacks associated with existing systems, the present disclosure describes a method that may be used to perform the ritual of chucking remotely. In particular, by utilizing the method described in the present disclosure, pilgrims who are unable to perform the ritual of chucking due to physical disability, age or sickness may perform the ritual by themselves remotely. The method described in the present disclosure is in line with the Islamic code (Shariah) which allows pilgrims who cannot carry out the ritual in person to do so via proxy.

Since remote chucking may reduce the number of pilgrims attending the ritual site, the overall congestion and the number of accidents associated with congestion may also be reduced. In particular, with the rise in the number of pilgrims attending the ritual site, the congestion at the Jamarāh may reduce with the implementation of the method described in the present disclosure. Another object is to provide a wireless communication method and projectile mechanism to allow scaling according to the number of pilgrims performing the ritual.

SUMMARY OF THE INVENTION

The present disclosure describes a method that allows a pilgrim to perform a ritual of chucking during Hajj. In particular, the present disclosure describes a method that may be used by pilgrims who are unable to perform the ritual of chucking, Rami, due to disability, age, or sickness.

The method of the present disclosure establishes a remote connection, using a central proxy server, between a remote user and a chucking system located at a religious site. For security purposes, the remote user is granted access to the chucking system after completing an authentication process. The chucking system includes a primary pebble reservoir, a set of secondary pebble reservoirs, and a set of pebble projecting units. A chucking process associated with the ritual of chucking involves chucking pebbles at a plurality of stoning sites. Therefore, to chuck pebbles at each of the plurality of stoning sites, a pebble projecting unit from the set of pebble projecting units is located at each of the plurality of stoning sites. To provide the necessary pebbles, a pebble reservoir from the set of secondary pebble reservoirs is positioned at each of the plurality of stoning sites. The primary pebble reservoir provides an adequate amount of pebbles to each of the set of secondary pebble reservoirs. The remote user, connected to the chucking system through the central proxy server, controls each of the set of pebble projecting units to perform the ritual of chucking at the plurality of stoning sites. When the chucking process is complete at each of the plurality of stoning sites, the remote user is notified regarding the completion through the central proxy server. Subsequently, the chucking system is assigned to a new remote user to perform the chucking process.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes a method that may be used to perform a ritual of chucking. More specifically, the method of the present disclosure may be used by pilgrims who are unable to perform Rami, which is the ritual of chucking pebbles during Hajj, due to disability, age or sickness.

Figure 1:
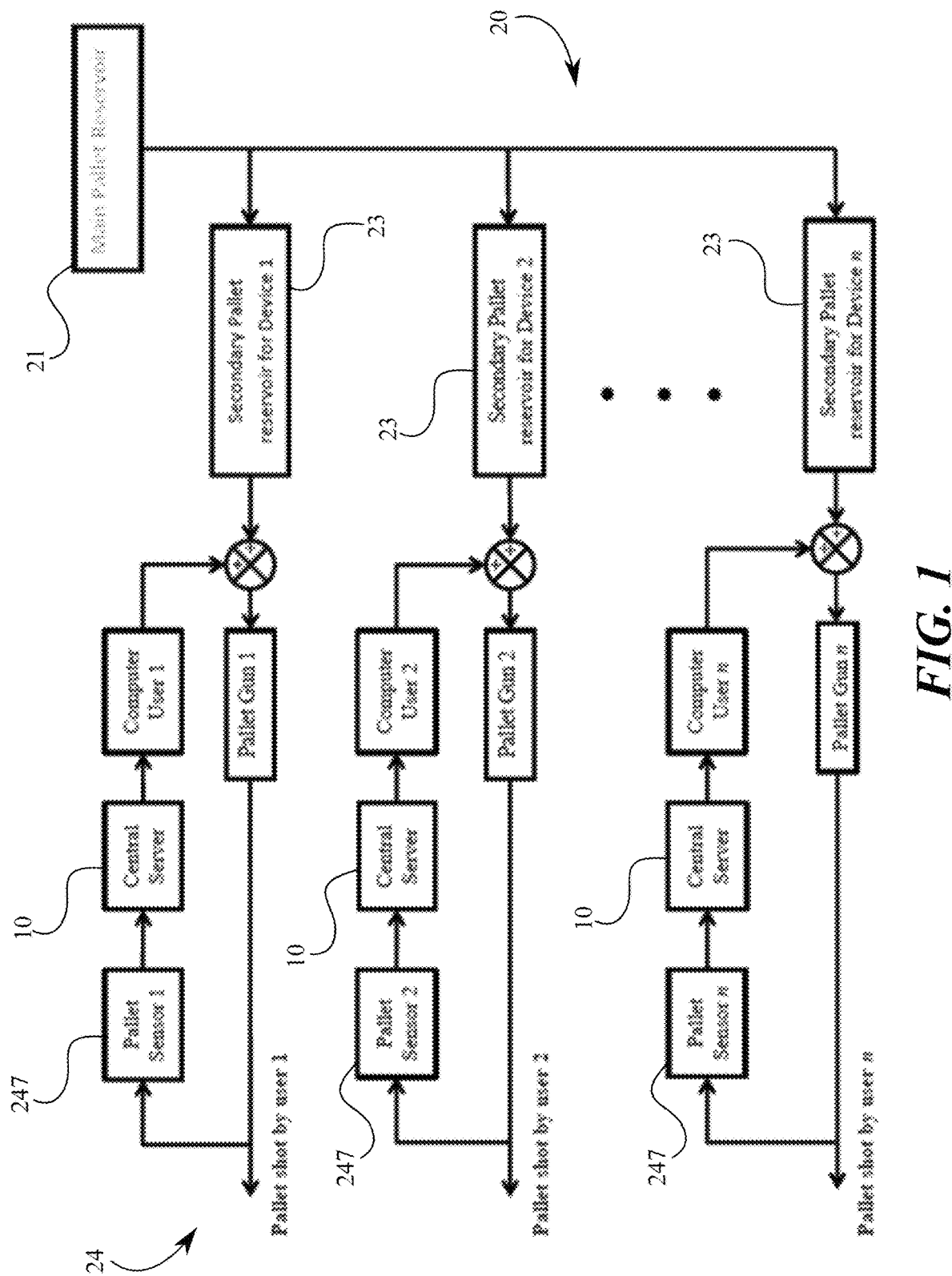
FIG. 1 is a block diagram illustrating the overall process flow of a chucking system described in the present disclosure.

By utilizing the method described in the present disclosure, a remote user, who is a pilgrim unable to be physically present at the religious site to perform the ritual of chucking, is connected to a chucking system 20 through a central proxy server 10 as shown in FIG. 1. The chucking system 20 is located at the religious site where the ritual is performed in real-time. To connect to the chucking system 20, the remote user initiates a request for an authentication code by connecting to the central proxy server 10 with a user interface. The authentication code is used to perform an authentication process that secures the connection between the remote user and the chucking system 20. When the request for the authentication code is received, the central proxy server 10 proceeds to generate an authentication code. Next, the authentication code is transmitted to the remote user from the central proxy server 10. Upon receiving the authentication code, the remote user enters the authentication code through the user interface to access the chucking system 20. Thus, the remote user may perform the chucking process by communicating to the chucking system 20 through the central proxy server 10. In particular, the central proxy server 10 includes circuitry with instructions configured to control the chucking system 20 shown in FIG. 1.

As further illustrated in FIG. 1, to allow the remote user to perform the chucking process, the chucking system 20, which is located at the religious site, comprises a primary pebble reservoir 21, a set of secondary pebble reservoirs 23, and a set of pebble projecting units 24. The primary pebble reservoir 21, which can be, but is not limited to, a container, is used to contain a number of pebbles used for the chucking process. Generally, the number of pebbles will satisfy the daily requirement of pebbles used during the chucking process.

Figure 2:
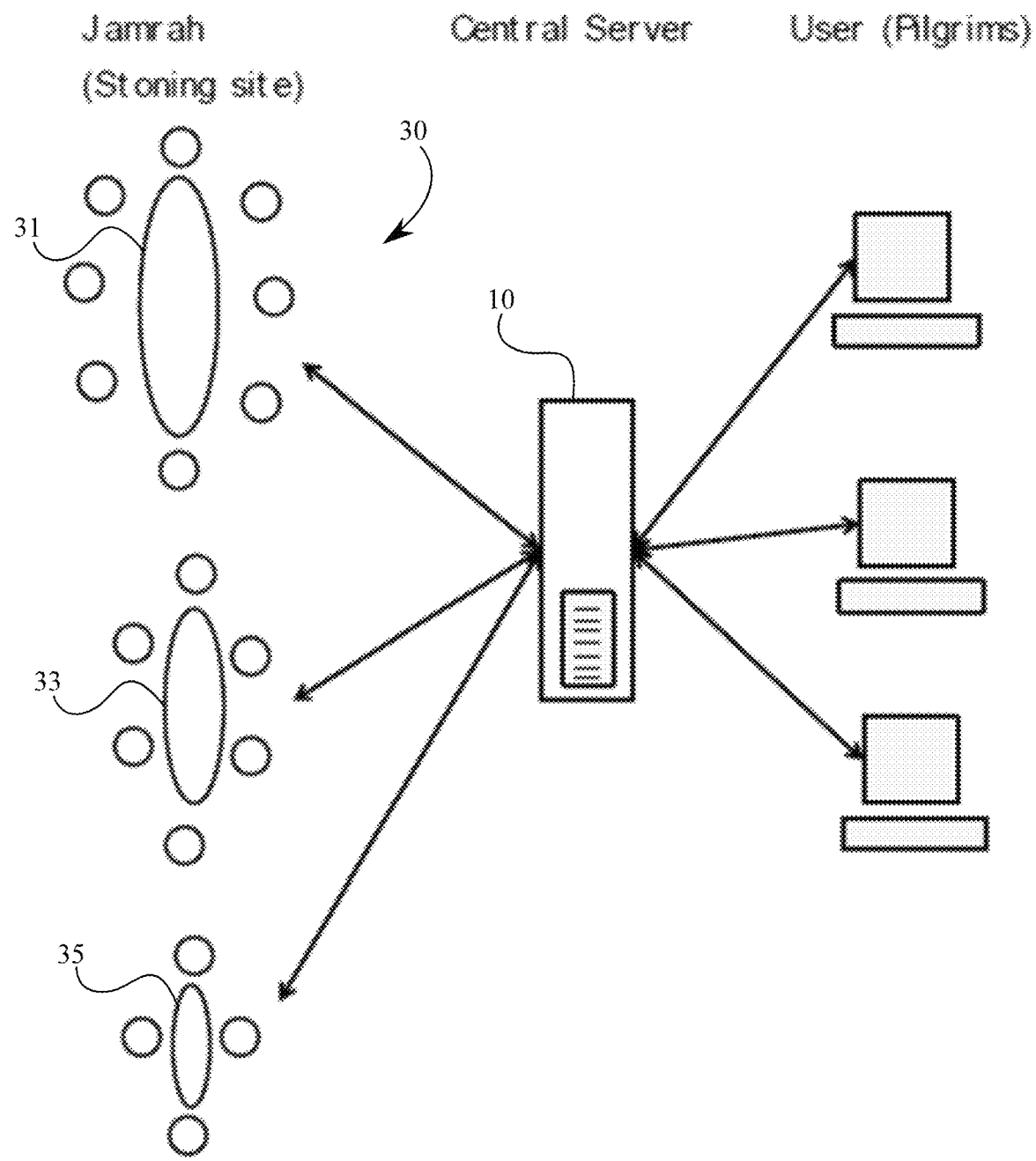
FIG. 2 is an illustration of the remote user being connected to the chucking system located at the religious site through a central proxy server.

As illustrated in FIG. 2, the ritual of chucking is performed at a plurality of stoning sites 30. In particular, the ritual of chucking involves 3 sites where the chucking process is performed. Thus, the plurality of stoning sites 30 comprises a first stoning site 31, a second stoning site 33, and a third stoning site 35. A secondary pebble reservoir from the set of secondary pebble reservoirs 23 is located at each of the plurality of stoning sites 30. Thus, the pilgrims having access to each of the plurality of stoning sites 30 may use the pebbles in the corresponding secondary pebble reservoir to perform the chucking process. In a preferred embodiment, where 3 stoning sites are generally required for the ritual of chucking, the set of secondary pebble reservoirs 23 may include 3 secondary pebble reservoirs.

As described earlier, the primary pebble reservoir 21 contains at least the number of pebbles that may be used by one or more persons to fulfill their respective daily requirements of pebbles. To transfer a portion of the number of pebbles to each of the set of secondary pebble reservoirs 23, the primary pebble reservoir 21 is operatively coupled with each of the set of secondary pebble reservoirs 23. Thus, the remote user may perform the chucking process at each of the plurality of stoning sites 30 using the portion of the number of pebbles.

Figure 3:
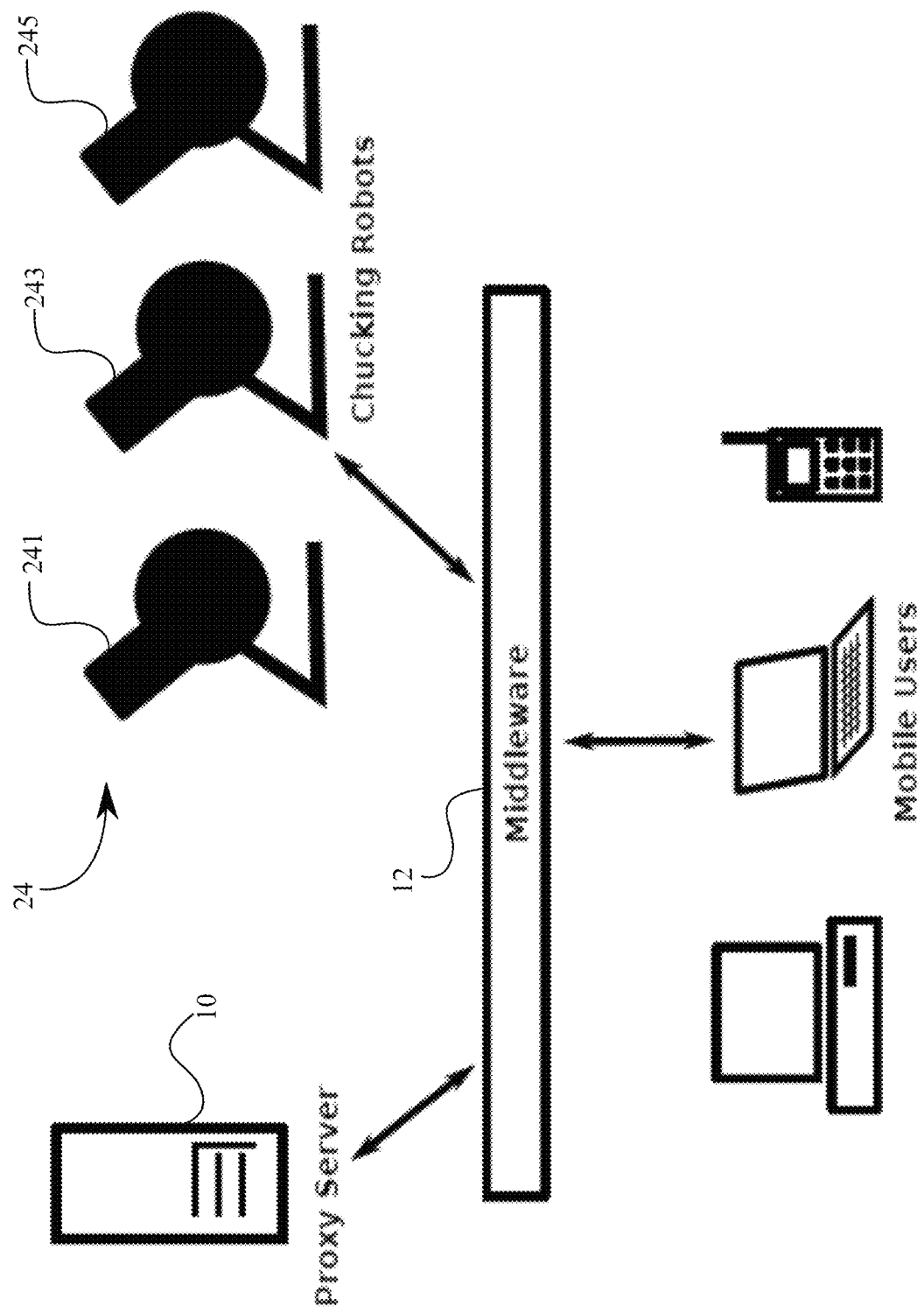
FIG. 3 is an illustration of the central proxy server and the remote user being interconnected to each other through a middleware.

The set of pebble projecting units 24 is used to perform the chucking motion, where a pebble is picked from a secondary pebble reservoir of the set of secondary pebble reservoirs 23 and chucked at a stoning site of the plurality of stoning sites 30 shown in FIG. 2. To do so, a pebble projecting unit of the set of pebble projecting units 24 is positioned at each of the plurality stoning sites 30. As described earlier, in a preferred embodiment, the plurality of stoning sites 30 comprises 3 stoning sites. As seen in FIG. 3, to correspond to the 3 stoning sites, the set of pebble projecting units 24 comprises a first pebble projecting unit 241, a second pebble projecting unit 243, and a third pebble projecting unit 245. In particular, the first pebble projecting unit 241 is positioned at the first stoning site 31. The second pebble projecting unit 243 is positioned at the second stoning site 33. The third pebble projecting unit 245 is positioned at the third stoning site 35. Therefore, each stoning site comprises a corresponding secondary pebble reservoir and also a corresponding pebble projecting unit.

As seen in FIGS. 1-3, to perform the chucking process at the first stoning site 31, the first pebble projecting unit 241 is mechanically engaged with the secondary pebble reservoir located at the first stoning site 31. The second pebble projecting unit 243 is mechanically engaged with the secondary pebble reservoir located at the second stoning site 33. The third pebble projecting unit 245 is mechanically engaged with the secondary pebble reservoir located at the third stoning site 35.

As illustrated in FIG. 3, in a preferred embodiment, each of the set of pebble projecting units 24 is a chucking robot. However, in other embodiments of the present disclosure, each of the set of pebble projecting units 24 may be, but is not limited to, a catapult, a spring-loaded projectile mechanism, a compressed air projectile mechanism, or a combustible gas projectile mechanism.

In one embodiment, catapults may be used to chuck pebbles during the ritual of chucking. A catapult is a ballistic device used to launch a projectile without the aid of gunpowder or other propellants. Catapults use the sudden release of potential energy to propel a load, which in this instance is a pebble. Most catapults convert tension or torsion energy that was manually built up within the device before release via springs, bows, twisted rope, elastic, and other comparable mechanisms. The type of catapult used in an embodiment of the present disclosure can be, but is not limited to, a ballista type, a mangonel type, and a trebuchet type.

The ballista type catapult is similar to a crossbow in terms of structure. Two wood arms are attached to a piece of rope and the rope is attached to a winch that is pulled back, bending the arms of the weapon. The tension built up in the rope is used to launch an object towards the target.

The mangonel type catapults generally contain an arm section with a bucket, wherein the object being projected is contained within the bucket. The arm section is pulled back such that energy is stored within a rope connected to the arm section and in the arm section. When released at the time of projection, the arm section would come to an upright position and come in contact with a block that prevents further movement of the arm section. At the point of stopping, the object within the bucket will be projected.

The trebuchet type catapults are generally made of a long beam attached by an axle suspended high above the ground by a frame and base, such that the beam can rotate vertically through a wide arc (typically over 180-degrees). A sling is attached to one end of the beam to hold the projectile. The projectile is thrown when the beam is quickly rotated by applying force to the opposite end of the beam. The mechanical advantage is primarily obtained by having the projectile section of the beam much longer than the opposite section where the force is applied—usually four to six times longer.

If a spring-loaded projectile mechanism is used in the set of pebble projecting units, the overall structure of the set of pebble projecting units may vary. Preferably, each of the set of pebble projecting units 24, shown in FIG. 1, may include a launching barrel with a washer used as the stopping mechanism that compresses a spring positioned within the launching barrel. The launching barrel will preferably be anchored to a structural body, and compressors may be used to compress the spring. Preferably, a servo motor is used with the compressors to generate a pulling force required to compress the spring. The distance of compression and the launching angle may vary according to need and user preference.

If a compressed air projectile mechanism is used in the set of pebble projecting units 24 seen in FIG. 1, each of the set of pebble projecting units 24 can be, but is not limited to, a pneumatic cannon. Pneumatic cannons are powered by pressurized gas, usually air or carbon dioxide, and comprises a compressed gas storage reservoir (chamber), a filling valve, a firing valve, a barrel, and a pressure gauge. To launch a projectile, which is a pebble in the present disclosure, the projectile is initially loaded into the barrel and the chamber is filled with air. By activating the firing valve, gas is transferred from the chamber to the barrel. The expansion of the compressed gas propels the projectile along the barrel. A length of the barrel determines the amount of time the projectile has to accelerate and ultimately the velocity of the projectile. To increase power and improve performance, gases with a higher speed of sound and particle speed may be used in the chamber.

If a combustible gas projectile mechanism is used in the set of pebble projecting units 24 seen in FIG. 1, each of the set of pebble projecting units 24 can be, but is not limited to, a combustion light-gas gun (CLGG). CLGG is a projectile weapon that utilizes the explosive force of low molecular-weight combustible gases, such as hydrogen mixed with oxygen, as propellant. When the gases are ignited, they burn, expand and propel the projectile out of the barrel with higher efficiency relative to solid propellant and have achieved higher muzzle velocities. In operation, light gas guns use a large diameter piston to force a gaseous working fluid through a smaller-diameter barrel containing the projectile to be accelerated. The reduction in diameter acts as a lever, increasing the speed while decreasing the pressure. In a different embodiment, each of the set of pebble projecting units 24 of FIG. 1 may be a hybrid electrothermal light-gas gun. The hybrid electrothermal light-gas gun works on similar principles of the standard light-gas gun, but adds an electric arc to heat the light gas to a higher temperature and pressure than when only a piston is used. The arc is applied in the chamber containing the light gas, raising the temperature and pressure to the point where the gas both breaks a bursting disk and ignites the propellant behind the piston, which is perforated to allow ignition. The resulting combination of electrical heating and piston compression provide higher pressures and temperatures, resulting in more power and a higher potential speed than a standard light-gas gun.

The ritual of chucking, Rami, requires the pilgrim to chuck 7 pebbles at each of the plurality of stoning sites 30. Therefore, preferably, 7 pebbles are used as the portion of the number of pebbles when only one pilgrim is accessing the chucking system 20. Furthermore, for the ritual of chucking to be complete, the pilgrim is required to chuck pebbles at each of the plurality of stoning sites 30.

As illustrated in FIG. 1, to ensure that the ritual of chucking is completed as required, the chucking process is monitored using a pebble sensor 247 integrated into each of the set of pebble projecting units 24. More specifically, the pebble sensor 247 monitors a projection of each of the portion of pebbles at each of the plurality of stoning sites 30, and sends a notification to the central proxy server 10 following a successful projection of a pebble. To do so, the pebble sensor 247 on each of the set of pebble projecting units 24 is communicably coupled with the central proxy server 10. Each successful projection is recorded using the central proxy server 10 so that the overall progress of the chucking process may be followed by the remote user and also monitored and recorded on the central proxy server 10. When the central proxy server 10 determines that the remote user has completed the chucking process, wherein 7 pebbles are chucked at each of the plurality of stoning sites 30 shown in FIG. 2, a notification is sent to the remote user regarding the completion of the chucking process. Next, after an authentication process is completed for a subsequent remote user, the chucking system 20 is allocated to the subsequent remote user through the central proxy server 10 so that the subsequent remote user can proceed with the chucking process.

In a preferred embodiment, the pebble sensor 247 shown in FIG. 1 can be, but is not limited to, a motion sensor, wherein a motion sensor is device that detects moving objects. When utilized within the method described in the present disclosure, the motion sensor may be used to detect the movement of a pebble. The motion sensor can be, but is not limited to, an ultrasonic sensor, a microwave sensor or a tomographic sensor.

Ultrasonic sensors can be either active or passive, where passive sensors focus on sound waves for operation. When used with the method described in the present disclosure, the sound generated from the movement of a pebble may be used by the passive sensors. Active sensors generate ultrasonic wave pulses and determine the reflection of the waves of a moving object. In a preferred embodiment, the moving object can be a pebble used in the chucking process. Microwave sensors generate microwave pulses to calculate the reflection off of objects in order to determine if an object is moving. Tomographic sensors generate radio waves and detect when the waves are disturbed. When utilized with the method described in the present disclosure, the movement of a pebble may be used to disturb radio waves generated by the tomographic sensors.

In addition to the pebble sensor 247 shown in FIG. 1, a camera may also be integrated into each of the set of pebble projecting units 24. Therefore, the remote user may be able to view the projection of pebbles at each of the plurality of stoning sites 30, illustrated in FIG. 2, in real-time. To do so, preferably, the camera on each of the set of pebble projecting units 24 is communicably connected to the central proxy server 10. Thus, the footage of the pebbles being chucked at each of the plurality of stoning sites 30 may be transferred to the remote user.

As described earlier, in order to complete the ritual of chucking, the pilgrim needs to perform the chucking process at each of the plurality of stoning sites 30 by starting the chucking process at the first stoning site 31 and ending the chucking process at the third stoning site 35 shown in FIG. 2. To perform the chucking process in sequential order, the remote user is connected to the first pebble projecting unit 241 positioned at the first stoning site 31, wherein the connection process is executed through the central proxy server 10 as seen in FIG. 1. Preferably, as seen in FIG. 3, a middleware 12 is utilized in connecting the remote user to each of the set of pebble projecting units 24. In particular, the middleware 12 may be used to assign a pebble projecting unit from the set of pebble projecting units 24 after the authentication process is complete, and can be especially beneficial when a large number of pilgrims are attempting to access the chucking system 20. The middleware 12 is also preferably utilized to manage the communication between the remote user and each of the set of pebble projecting units 24 such that the set of pebble projecting units 24 can respond to the commands of the remote user in real-time.

In one embodiment, the middleware 12 shown in FIG. 3 can be a message oriented middleware that allows messages to be sent and received over distributed applications. With message oriented middleware, the communication process becomes less complicated when using applications spread over various platforms and working across various operating systems and network protocols. In addition to enabling the transmission of messages across distributed applications, message oriented middleware also has a queuing mechanism that allows the interaction between the central proxy server 10 and the remote user to happen metachronously in situations where the target node is busy or slow. Thus, the message oriented middleware prevents the message from getting misplaced while awaiting to get to the central proxy server 10 or remote user.

In another embodiment, the middleware 12 seen in FIG. 3 can be a remote procedure call (RPC) middleware. RPC middleware is a client-server that allows the functionality of an application to be distributed across multiple platforms. RPC middleware is a protocol used by local programs to request service from programs located on a remote computing device without requiring specific network details.

In another embodiment, database middleware may be used as the middleware 12 shown in FIG. 3. Database middleware allows direct access and interaction with a database. When used within the method of the present disclosure, the database middleware may be used to access a database of remote users attempting to access the chucking system 20 shown in FIG. 1. In another instance, the database middleware may be used to access the database of the Ministry of Hajj that grants permission to the remote users to access the chucking system 20.

In another embodiment, the middleware 12 shown in FIG. 3 may be an object middleware. Also known as an object request broker, the role of object middleware is to control the communication between objects in distributed computing. Object middleware allows one computer to make program calls to another through a computer network.

In a different embodiment, the middleware 12 shown in FIG. 3 may be a robotic middleware. Robotic middleware is generally used for building extensive software systems for controlling robot systems. Robotic middleware helps to manage and control the heterogeneity and complexity of the hardware and software systems that form part of a robot.

In a different embodiment, the middleware 12 shown in FIG. 3 may be an integration middleware which provides an integration framework through which operations, executions, and runtime services from several applications may be monitored and controlled. Integration middleware can also be useful in combining data from several different sources into one unified platform where users can access and manipulate the data.

In a different embodiment, the middleware 12 shown in FIG. 3 may be a content-centric middleware which allows developers to extract a portion of content without knowing how a system obtains the content.

The middleware 12, shown in FIG. 3, can be of one type in certain embodiments of the present disclosure. However, in other embodiments, the middleware 12 may also be a combination of middleware types.

When connected to the chucking system 20 of FIG. 1, the remote user may use the first pebble projecting unit 241, shown in FIG. 3, to chuck the portion of the number of pebbles provided by the secondary pebble reservoir towards the first stoning site 31 shown in FIG. 2. The remote user is connected to the first pebble projecting unit 241 for a first predetermined time period, wherein the remote user is required to perform the chucking process within the first predetermined time period. The central proxy server 10 records a chucking time occupied by the remote user at the first stoning site 31. If the chucking time occupied by the remote user at the first stoning site 31 is greater than the first predetermined time period, the remote user is blocked from the chucking system 20 through the central proxy server 10.

As per the ritual of chucking, when 7 pebbles are chucked at the first stoning site 31, the remote user is allocated to the second pebble projecting unit 243 through the central proxy server 10 to continue the chucking process at the second stoning site 33 shown in FIG. 2. Simultaneously, to replace pebbles previously chucked by the remote user at the first stoning site 31, a portion of the number of pebbles, which is 7 in a preferred embodiment, is transferred from the primary pebble reservoir 21 to the secondary pebble reservoir located at the first stoning site 31. To do so, the primary pebble reservoir 21 is operatively coupled with the secondary pebble reservoir located at the first stoning site 31.

When the remote user is allocated to the second pebble projecting unit 243, the connection with the second pebble projecting unit 243 allows the remote user to perform the chucking process at the second stoning site 33 shown in FIG. 2. More specifically, the remote user may use the second pebble projecting unit 243 to chuck the portion of the number of pebbles provided by the secondary pebble reservoir towards the second stoning site 33. The remote user is connected to the second pebble projecting unit 243 for a second predetermined time period, wherein the remote user is required to perform the chucking process within the second predetermined time period. The central proxy server 10 records a chucking time occupied by the remote user at the second stoning site 33. If the chucking time occupied by the remote user at the second stoning site 33 is greater than the second predetermined time period, the remote user is blocked from the chucking system 20 through the central proxy server 10.

As per the ritual of chucking, when 7 pebbles are chucked at the second stoning site 33, the remote user is allocated to the third pebble projecting unit 245 through the central proxy server 10 to continue the chucking process at the third stoning site 35 shown in FIG. 2. Simultaneously, to replace the pebbles chucked by the remote user at the second stoning site 33, a portion of the number of pebbles, which is 7 in a preferred embodiment, is transferred from the primary pebble reservoir 21 to the secondary pebble reservoir located at the second stoning site 33. To do so, the primary pebble reservoir 21 is operatively coupled with the secondary pebble reservoir located at the second stoning site 33.

When the remote user is allocated to the third pebble projecting unit 245, the connection with the third pebble projecting unit 245 allows the remote user to perform the chucking process at the third stoning site 35 shown in FIG. 2, wherein the third stoning site 35 is the final stoning site in a preferred embodiment. The remote user may use the third pebble projecting unit 245 to chuck the portion of the number of pebbles provided by the secondary pebble reservoir towards the third stoning site 35. The remote user is connected to third pebble projecting unit 245 for a third predetermined time period, wherein the remote user is required to perform the chucking process within third predetermined time period. The central proxy server 10 records a chucking time occupied by the remote user at the third stoning site 33. If the chucking time occupied by the remote user at the third stoning site 35 is greater than the third predetermined time period, the remote user is blocked from the chucking system 20 through the central proxy server 10.

As per the ritual of chucking, when 7 pebbles are chucked at the third stoning site 35 shown in FIG. 2, the remote user completes the ritual of chucking. Thus, using the central proxy server 10, the remote user is notified regarding the completion of the ritual of chucking. To replace the pebbles chucked by the remote user at the third stoning site 35, a portion of the number of pebbles, which is 7 in a preferred embodiment is transferred from the primary pebble reservoir 21 to the secondary pebble reservoir located at the third stoning site 35. To do so, the primary pebble reservoir 21 is operatively coupled with the secondary pebble reservoir located at the third stoning site 35.

An algorithm that may be used to assign the user to each of the set of pebble projecting units 24 at each of the plurality of stoning sites 30 is as follows:

Algorithm 1: Algorithm showing how the proposed system should be implemented

```
 1: Mainreservoir ← Pebbles
 2: If (Secondaryreservoir == empty) then
 3:    Secondaryreservoir ← Pebbles_Mainreservoir
 4: end if
 5: Auth ← Security_Code
 6: Original_code ← Security_Code_Database
 7: while (Auth ≠ Original_code) do
 8:    Print "AccessDenied"
 9: end while
10: Count ← 0
11: for (i = 0; < 3; i++) do
12:    while Count < 7) do
13:       repeat
14:          cmd ← User_command
15:       until (cmd == Shoot_command)
16:       Count ++
17:    end while
18:    re − allocate pallet − gun
19: end for
20: Print "Rami Complete"
21: End
```

However, a different algorithm may be used in other embodiments of the system described in the present disclosure.

Figure 4:
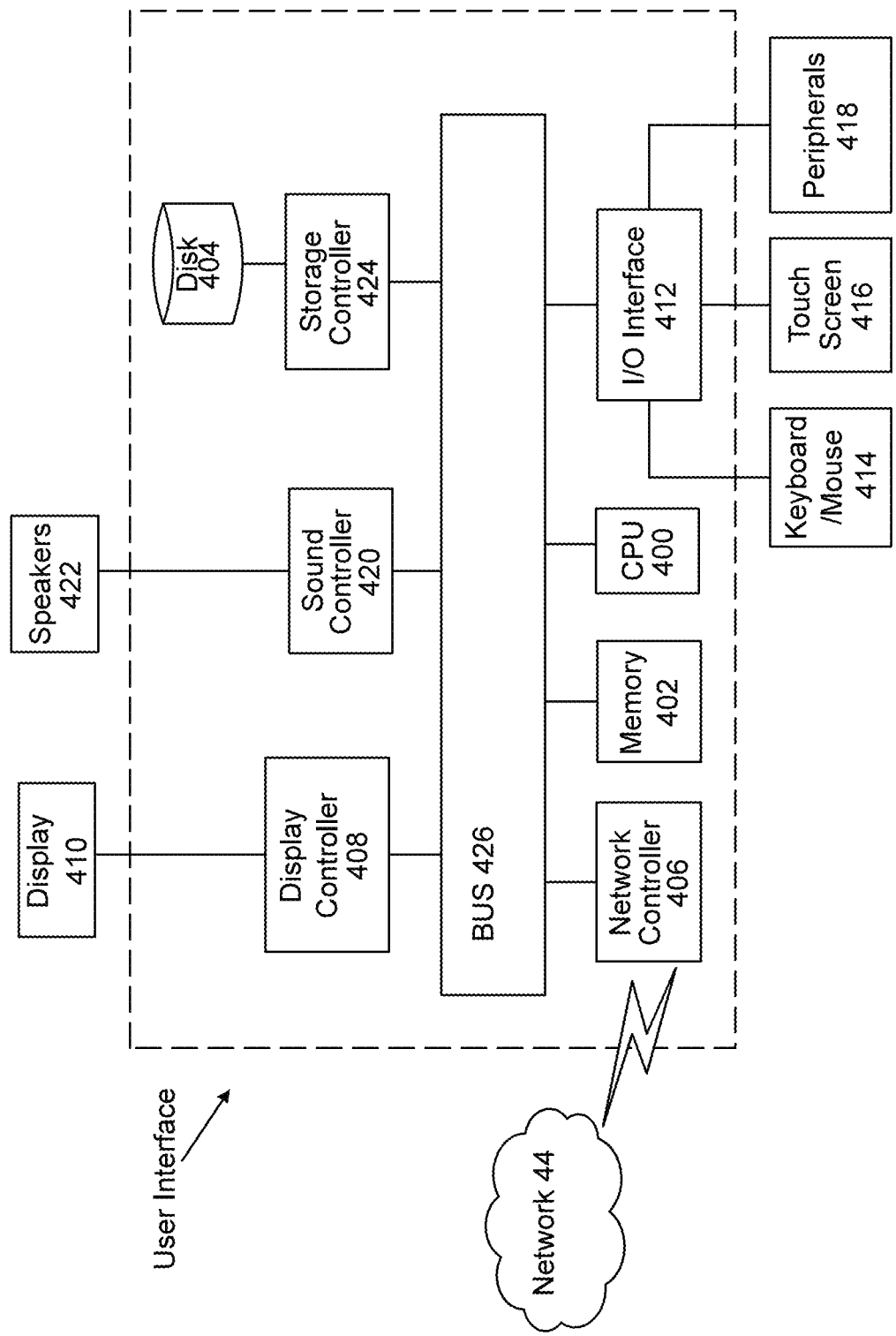
FIG. 4 is a schematic block diagram illustrating a hardware configuration of a user interface used by the remote user to control the chucking system of the present disclosure.

Next, a hardware description of the user interface according to exemplary embodiments is described with reference to FIG. 4. In FIG. 4, the user interface includes a CPU 400 which performs the processes described above/below. The process data and instructions may be stored in memory 402.

These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the user interface communicates, such as a server or computer.

Further, the claimed advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

The hardware elements in order to achieve the user interface may be realized by various circuitry elements, known to those skilled in the art. For example, CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The user interface in FIG. 4 also includes a network controller 406, such as an Intel Ethernet PRO network interface card from Intel Corporation of America, for interfacing with network 44. As can be appreciated, the network 44 can be a public network, such as the Internet, or a private network such as an LAN or WAN network, or any combination thereof and can also include PSTN or ISDN subnetworks. The network 44 can also be wired, such as an Ethernet network, or can be wireless such as a cellular network including EDGE, 3G and 4G wireless cellular systems. The wireless network can also be WiFi, Bluetooth, or any other wireless form of communication that is known.

The user interface further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the user interface, such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the user interface. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 5.

Figure 5:
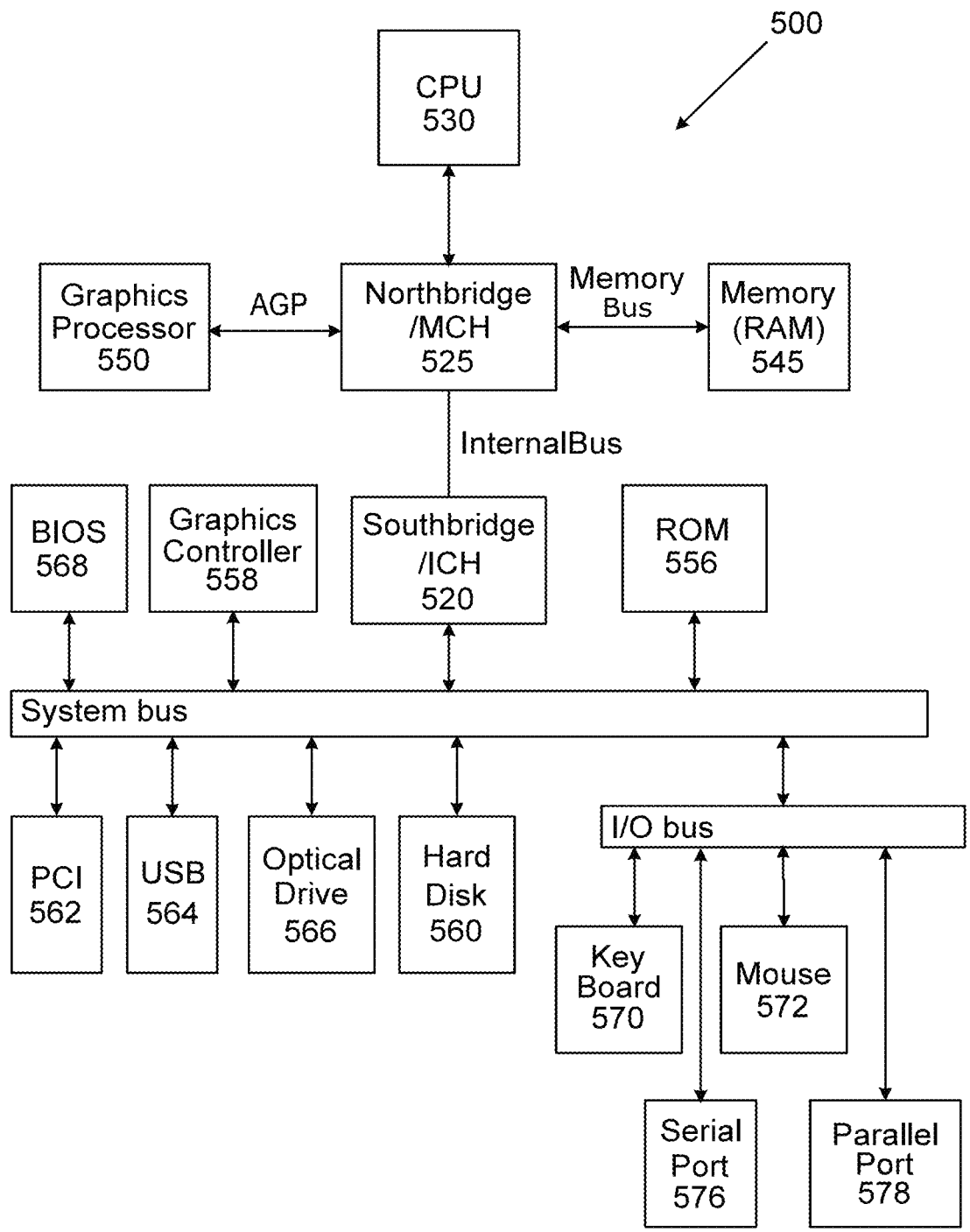
FIG. 5 is a schematic block diagram of a data processing system associated with the user interface of the method of the present disclosure.

FIG. 5 shows a schematic diagram of a data processing system, according to certain embodiments, for performing the chucking process. The data processing system is an example of a computer in which code or instructions implementing the processes of the illustrative embodiments may be located.

In FIG. 5, data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and even may be implemented using one or more heterogeneous processor systems.

Figure 6:
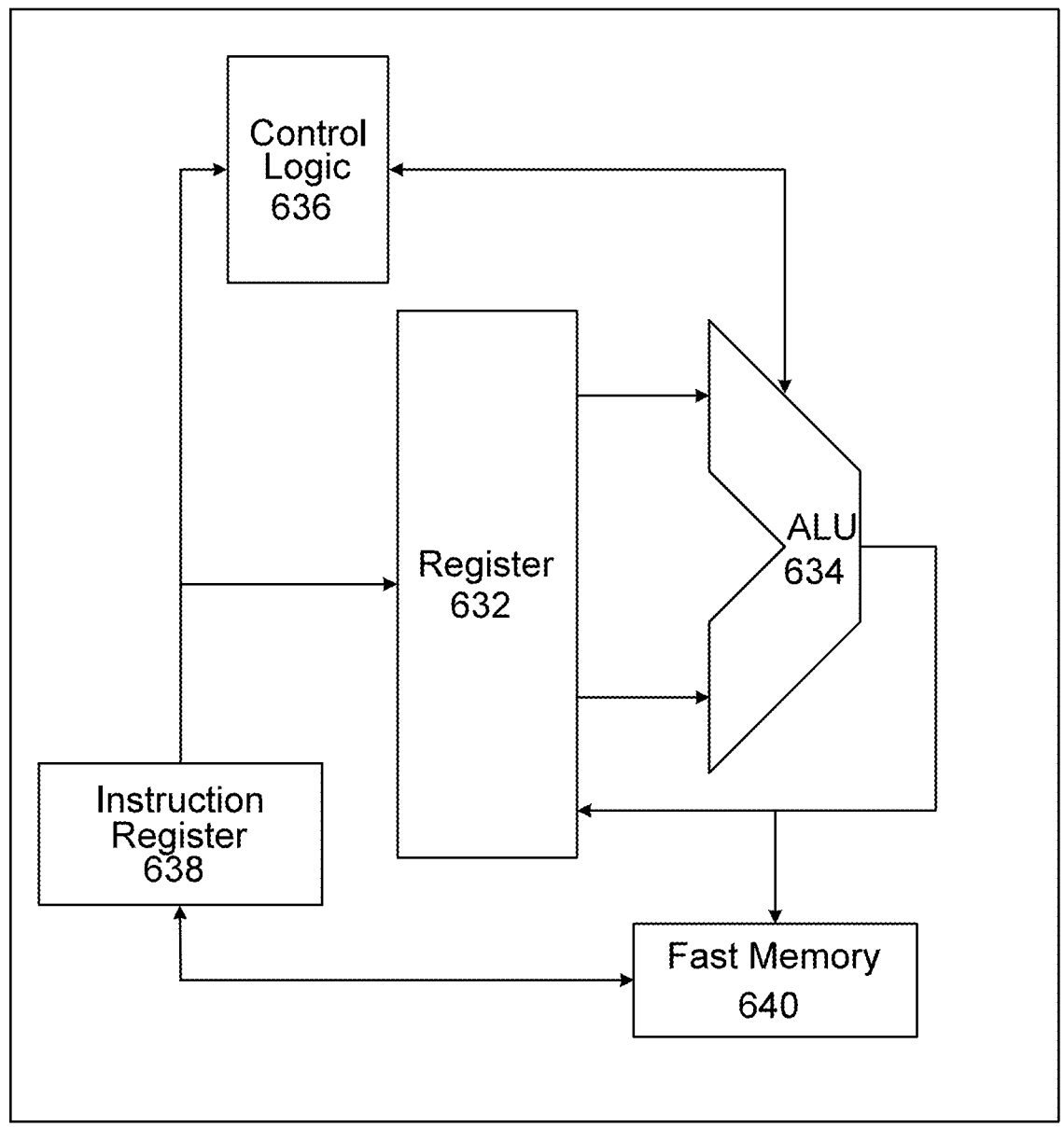
FIG. 6 is a schematic block diagram illustrating one implementation of a central processing unit associated with the user interface used by the remote user to control the chucking system described in the present disclosure.

For example, FIG. 6 shows one implementation of CPU 530. In one implementation, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain implementations, the instruction set architecture of the CPU 530 can use a reduced instruction set architecture, a complex instruction set architecture, a vector processor architecture, a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 500 can include that the SB/ICH 520 is coupled through a system bus to an I/O Bus, a read only memory (ROM) 556, universal serial bus (USB) port 564, a flash binary input/output system (BIOS) 568, and a graphics controller 558. PCI/PCIe devices can also be coupled to SB/ICH 520 through a PCI bus 562.

The PCI devices may include, for example, Ethernet adapters, add-in cards, and PC cards for notebook computers. The Hard disk drive 560 and CD-ROM 566 can use, for example, an integrated drive electronics (IDE) or serial advanced technology attachment (SATA) interface. In one implementation the I/O bus can include a super I/O (SIO) device.

Further, the hard disk drive (HDD) 560 and optical drive 566 can also be coupled to the SB/ICH 520 through a system bus. In one implementation, a keyboard 570, a mouse 572, a parallel port 578, and a serial port 576 can be connected to the system bust through the I/O bus. Other peripherals and devices that can be connected to the SB/ICH 520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 7:
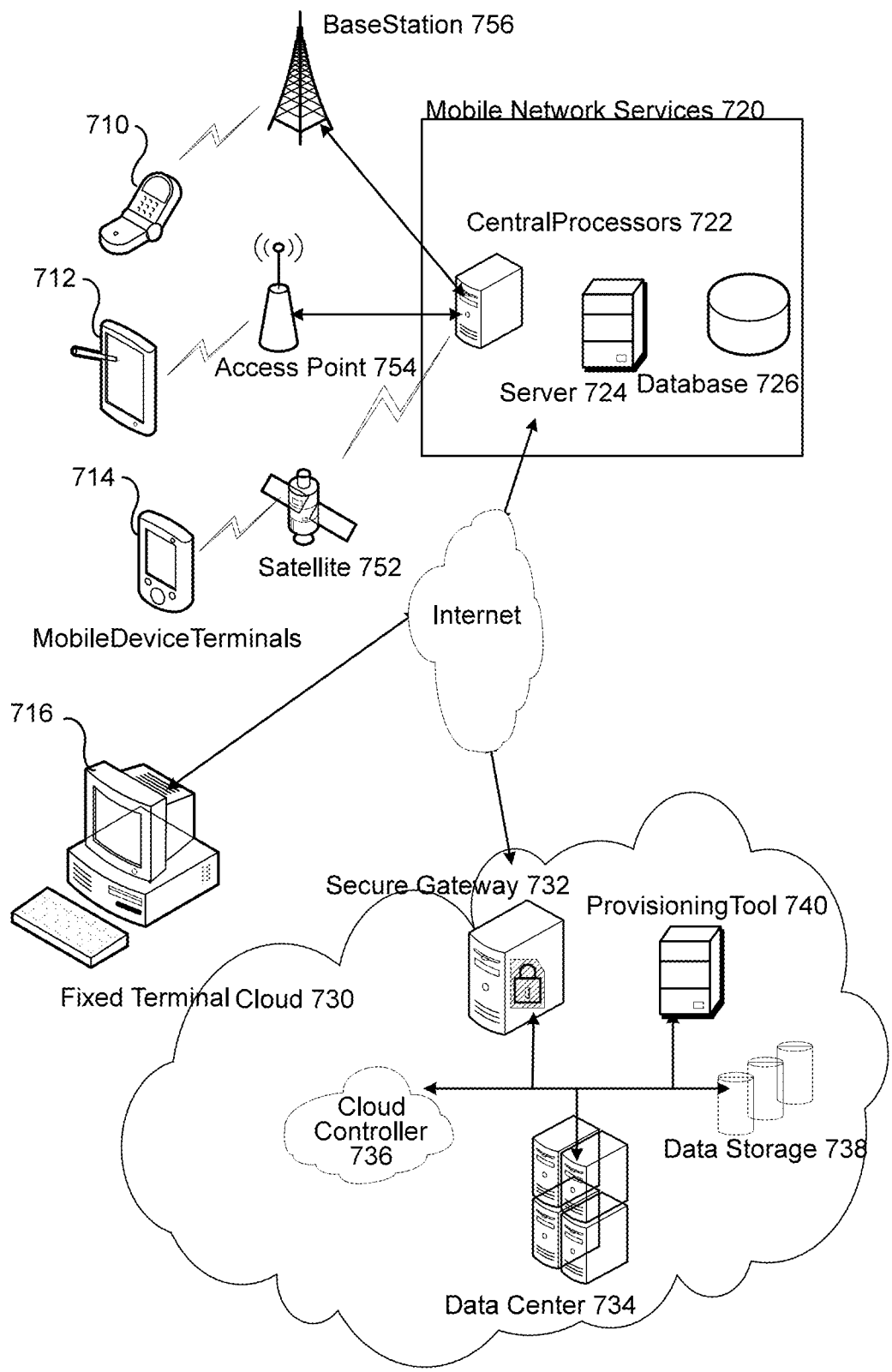
FIG. 7 is a schematic block diagram illustrating the process of utilizing multiple processors distributed across a network to connect the remote user to the chucking system located at the religious site.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 7, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Terminology used herein is for the purpose of describing particular embodiments only and is not intended to be limiting of the invention.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of remotely performing a ritual of chucking, comprising:

initiating a request for an authentication code, wherein the request for the authentication code is initiated by a remote user through a user interface connected to a central proxy server;

generating an authentication code at the central proxy server to connect the remote user to a chucking system;

transmitting the authentication code from the central proxy server to the remote user to allow the remote user to perform a chucking process using the chucking system, wherein the remote user is connected to the chucking system through the central proxy server;

monitoring and recording the chucking process using the central proxy server for a plurality of stoning sites, wherein the remote user performs the chucking process at each of the plurality of stoning sites;

notifying the remote user, through the central proxy server, when the chucking process is complete for each of the plurality of stoning sites; and allocating the chucking system to a subsequent remote user through the central proxy server when a new request for an authentication code is received at the central proxy server;

connecting the remote user to the first pebble projecting unit through the central proxy server for a first predetermined time period;

allocating the remote user to the second pebble projecting unit through the central proxy server when the chucking process is complete at the first stoning site;

recording, using the central proxy server, a chucking time for the remote user at the first stoning site; and blocking the remote user from the chucking system if the chucking time at the first stoning site is greater than the first predetermined time period;

wherein the plurality of stoning sites comprises a first stoning site, a second stoning site, and a third stoning site, wherein the chucking system comprises a first pebble projecting unit, a second pebble projecting unit, and a third pebble projecting unit, wherein the first pebble projecting unit is positioned at the first stoning site, the second pebble projecting unit is positioned at the second stoning site, and the third pebble projecting unit is positioned at the third stoning site.

2. The method of remotely performing a ritual of chucking of claim 1, wherein the plurality of stoning sites comprises a first stoning site, a second stoning site, and a third stoning site, wherein the chucking system comprises a first pebble projecting unit, a second pebble projecting unit, and a third pebble projecting unit, wherein the first pebble projecting unit is positioned at the first stoning site, the second pebble projecting unit is positioned at the second stoning site, and the third pebble projecting unit is positioned at the third stoning site; and the method further comprises:

connecting the remote user to the second pebble projecting unit through the central proxy server for a second predetermined time period; and allocating the remote user to the third projecting unit through the central proxy server when the chucking process is complete at the second stoning site.

3. The method of remotely performing a ritual of chucking of claim 2, further comprising:

recording, using the central proxy server, a chucking time for the remote user at the second stoning site; and blocking the remote user from the chucking system if the chucking time at the second stoning site is greater than the second predetermined time period.

4. The method of remotely performing a ritual of chucking of claim 1, wherein the plurality of stoning sites comprises a first stoning site, a second stoning site, and a third stoning site, wherein the chucking system comprises a first pebble projecting unit, a second pebble projecting unit, and a third pebble projecting unit, wherein the first pebble projecting unit is positioned at the first stoning site, the second pebble projecting unit is positioned at the second stoning site, and the third pebble projecting unit is positioned at the third stoning site; and the method further comprises:

connecting the remote user to the third pebble projecting unit through the central proxy server for a third predetermined time period; and notifying the remote user through the central proxy server when the chucking process is complete at the third stoning site.

5. The method of remotely performing a ritual of chucking of claim 4, further comprising:

recording, using the central proxy server, a chucking time for the remote user at the third stoning site; and blocking the remote user from the chucking system if the chucking time at the third stoning site is greater than the third predetermined time period.

6. The method of remotely performing a ritual of chucking of claim 1, wherein the remote user is connected to the chucking system through a middleware, wherein the middleware manages the connection and the communication between the remote user and chucking system.

7. The method of remotely performing a ritual of chucking of claim 1, wherein the central proxy server includes circuitry with instructions configured to control the chucking system comprising:

a primary pebble reservoir, wherein a number of pebbles used for the chucking process is contained within the primary pebble reservoir;

a set of secondary pebble reservoirs, wherein a secondary pebble reservoir from the set of secondary pebble reservoirs is positioned at each of the plurality of stoning sites;

the primary pebble reservoir is operatively coupled with each of the set of secondary pebble reservoirs to provide a portion of the number of pebbles to each of the set secondary pebble reservoirs;

a set of pebble projecting units to chuck the portion of the number of pebbles at each of the plurality of stoning sites, wherein the set of pebble projecting units comprises a first pebble projecting unit, a second pebble projecting unit, and a third pebble projecting unit, wherein the first pebble projecting unit is positioned at a first stoning site of the plurality of stoning sites and is mechanically engaged with a secondary pebble reservoir located at the first stoning site;

wherein the second pebble projecting unit is positioned at a second stoning site of the plurality of stoning sites and is mechanically engaged with a secondary pebble reservoir located at the second stoning site; and wherein the third pebble projecting is positioned at a third stoning site of the plurality of stoning sites and is mechanically engaged with a secondary pebble reservoir located at the third stoning site.

8. The method of remotely performing a ritual of chucking of claim 7, wherein a pebble sensor is integrated into each of the set of pebble projecting units to monitor a projection of a pebble towards each of the plurality of stoning sites, wherein the pebble sensor is communicably coupled with the central proxy server.

9. The method of remotely performing a ritual of chucking of claim 7, wherein a camera is integrated into each of the set of pebble projecting units to view a projection of a pebble towards each of the plurality of stoning sites, wherein the camera is communicably coupled with the central proxy server.

10. The method of remotely performing a ritual of chucking of claim 7, wherein each of the set of pebble projecting units is a chucking robot.

11. The system and method of remotely performing a ritual of chucking of claim 7, wherein the portion of the number of pebbles comprises 7 pebbles.

* * * * *